United States Patent [19]

Heiniger

[11] Patent Number: 4,655,566

[45] Date of Patent: Apr. 7, 1987

[54] LARGE FILM IMAGE FRAME TRANSPORT MECHANISM

[76] Inventor: Ernst Heiniger, 110 Bahnhofstrasse, Zurich, 8001, Switzerland

[21] Appl. No.: 880,149

[22] Filed: Jun. 30, 1986

[51] Int. Cl.⁴ .............................................. G03B 1/48
[52] U.S. Cl. .................................... 352/225; 352/184; 352/224; 352/227; 352/228
[58] Field of Search ............... 352/184, 224, 225, 227, 352/228

[56] References Cited

U.S. PATENT DOCUMENTS 2,631,492  3/1953  Calvin .................................. 352/184
3,165,250  1/1965  Ewald et al. ......................... 352/184
3,937,378  2/1976  Kopernicky ......................... 352/184

FOREIGN PATENT DOCUMENTS 505136  12/1954  Italy .................................... 352/184

Primary Examiner—Monroe H. Hayes
Attorney, Agent, or Firm—I. Michael Bak-Boychuk

[57] ABSTRACT

A film transport mechanism including an aperture assembly through which the film is advanced, the aperture assembly defining a film path of a waveform longer or equal to the fundamental modal waveform of the film. The film path may include bristle like strips for damping film waveforms higher than the first mode.

6 Claims, 4 Drawing Figures

LARGE FILM IMAGE FRAME TRANSPORT MECHANISM

BACKGROUND OF THE INVENTION

1. Field of the Invention

The present invention relates to the film transport mechanisms, and more particularly to improvements therein for transporting large image frames.

2. Description of the Prior Art

The transport of film past a projection aperture has gone through extensive technical evolution, evolution which is characteristically directed at reducing film stress in the course of intermittent transport. Typically such transport entails engagement of the film strip by mechanisms generally known under the designation "Geneva Movement" where a mechanical arm engages perforations at the edge of the film. Film transport of the foregoing form resolves the acceleration loads of the intermittent frame advancement directly at the edges of the perforations. As a consequence perforation wear and tearing is a substantial problem.

Of particular interest in the film projection art is the present interest in transporting large images. This interest is motivated by expansions in the viewed screen size, expansions which now contemplate virtually complete circular viewing.

In the past, substantial advances have been made in the film material, advances which now approach limits of polymer chemistry and thus approach limits in the best mass/strength ratio of the material. Consequently, only marginal improvements are available in optimizing film dimensions and better results are obtainable in the shaping of the film advancement transients. It is the optimization of these transient shaping techniques that is sought in the art and it is one such technique that is disclosed herein.

SUMMARY OF THE INVENTION

Accordingly, is the general purpose and object of the present invention to provide an intermittent film transport mechanism which limits the number of elastic modes excited in the film strip.

Other objects of the invention are to provide a film transport mechanism for intermittent translation of large film images.

Briefly, these and other objects are accomplished within the present invention by providing a film transport mechanism in which the film path at the projection aperture follows the shape of the first elastic mode of the film strip. The shoe and guide between which the film strip passes across the aperture are then coated at selected opposing locations with bristle-like material, or felt, similar to velvet, in order to develop frictional contact any higher elastic modes that may be be excited. Consequently the acceleration and deceleration of the film strip, in the course of each intermittent frame passage is thus confined to excite the fundamental mode only, with the higher modes taken out through bristle contact. An intermittent movement effected by sprockets is then driven into contact with the film perforations, geometrically conformed to apply the acceleration function in accordance with the fundamental mode. Accordingly, the initial contact of the sprockets with the film perforation sets off the first elastic mode of the film strip which then resolves itself in frame translation between the guide and the shoe of the aperture.

To control the shape of the excited elastic wave and to decouple same from the remainder of the film strip free loops are formed in the strip on either side of the aperture, each free loop being equal or greater than the fundamental mode. To fix the modes of motion in the free loops both the fore and aft segments include guides, once again, conformed to the fundamental wave form. Thus, the film passes from a shaped input piece onto a shaped output piece which further limit or reduce the possible presence of higher modes.

This particular transport arrangement uniquely lends itself to transporting large image frames, image frames associated with spherical or cylindrical image projection. Of course, the foregoing mechanism may be further provided with additional secondary drive elements and expansion loops which under spring loading isolate the intermittent frame advancement from the storage reels.

The comprehension of the effects discussed herein is best set out by reference to impulsive admittance. Impulsive admittance responds to a forcing function of a particular shape by superposition. Simply, an elastic system which responds well to modeling by linear equations of elastic motion is also expressed correctly in its response by progressive difference calculations of the elastic modes. Thus, the general response function of an elastic device appears as the superposition of incremental responses to a sequence of impulses which approximate the forcing function. It is this forcing function that originates at the drive sprocket of the transport described herein and it is this forcing function that is shaped herein to minimize the excitation of higher frequency modes. One should note that linear approximations of elastic motion are particularly suited for thin elastic membranes like film strips and consequently best describe the technique developed herein.

DESCRIPTION OF THE PREFERRED EMBODIMENT

Figure 1:
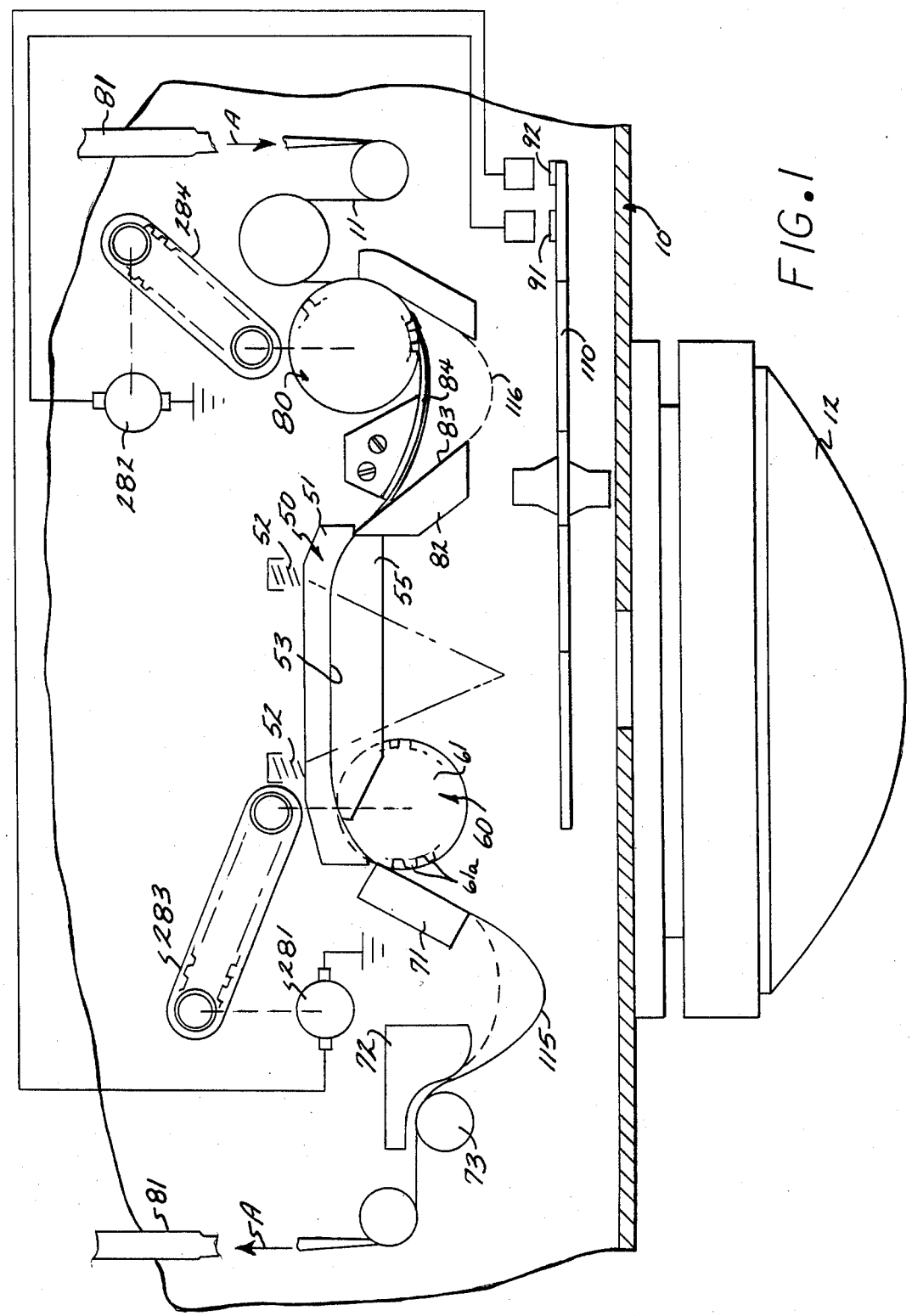
FIG. 1 is a sectional view, in diagrammatic detail, of the significant elements of the invention disclosed.
Figure 2:
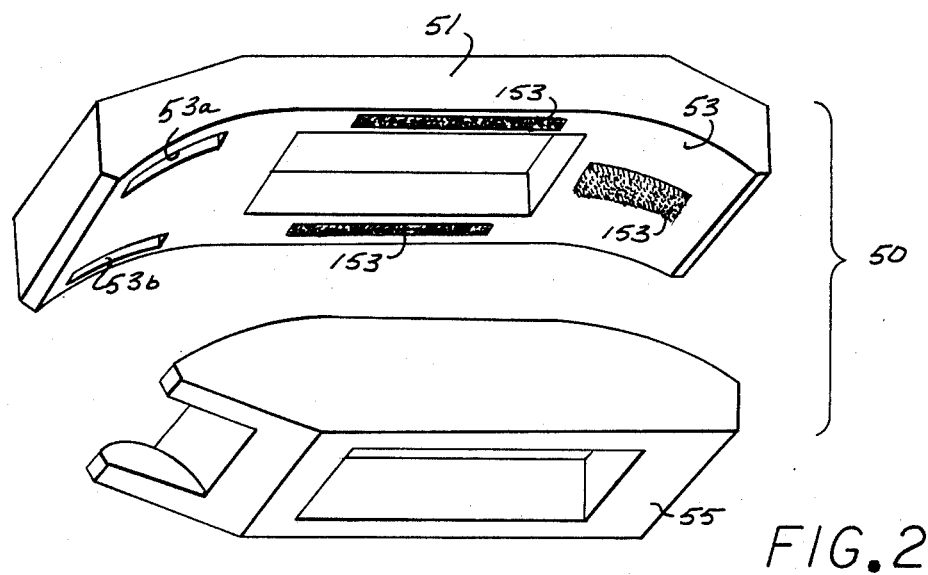
FIG. 2 is a perspective illustration illustrated by parts of the inventive aperture assembly.
Figure 3:
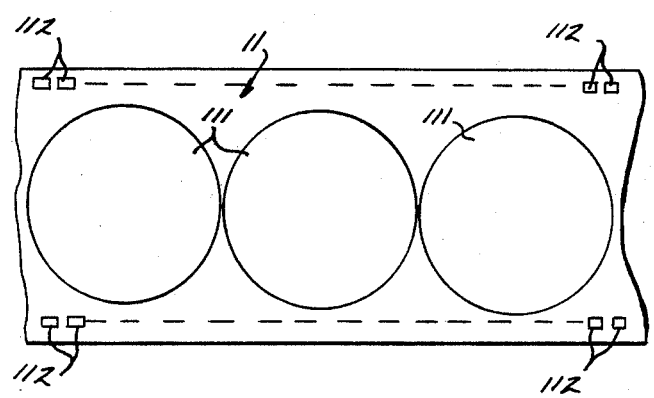
FIG. 3 is a plan view of a film strip useful with the invention herein.

As shown in FIGS. 1-3 the film transport mechanism, generally designated by the numeral 10, is particularly suited for the transport of a large (70 mm. or greater width) film strip 11 for cylindrical or spherical display by way of a fisheye len 12. In order to present a cylindrical or spherical image, film strip 11 includes in the surface thereof a sequence of circular image frames 111 which consequently spread over a longer frame dimension than conventional rectangular frames. The consequent effect of a circular image frame is an increase in film strip mass and linear travel in the course of each frame translation. Thus the force necessary to translate the frame is higher since the filtering time constants of a human eye are fixed.

To accommodate these increased levels of force input the present invention provides an aperture assembly generally shown at 50 including a concavely dished guide structure 51 supported by springs 52 to oppose a shaped aperture shoe 55. Shoe 55 has a longitudinal dimension along the path A of the film strip 11 which is less than the opposing surface 53 of the guide 51. Thus, a surface overhang 253 is formed at the trailing end of the aperture assembly. This surface overhang conforms to the exterior periphery of a sprocket wheel assembly 60 including two coaxial sprocket wheels 61 and 62 aligned to engage perforations 112 at the edges of the film strip 11. To effect this engagement each of the sprocket wheels 61 and 62 includes about the periphery thereof sprocket teeth 61a and 62a which pass through the film perforations into grooves 53a and 53b in the overhanging surface 253 of guide 51.

As will be shown further sprocket assembly 60 is driven intermittently and in the course of each intermittent advancement cycle the film strip 11 is pulled by the dimension of one frame. The film strip frame thus pulled is then replaced by a subsequent frame and the preceding frame is laid as a free loop along a guide block 71 aligned at an inclination I relative the plane of the aperture. The radius of curvature at the outlet of surface 53 and the free loop dimension are selected to approximate the first elastic mode of the strip. Thus, the radial dimension of the sprocket assembly 60 and the location of the guide block 71, together with the end segment of surface 53 conform to the fundamental mode of bending of the film strip and will therefore excite only the fundamental elastic mode therein. In this manner the higher modal components of elastic motion of the film strip are effectively reduced. The extended section of the film strip 11 passing beyond block 71 is shown as a free loop segment 115 which at its forward end makes a point contact with a shaped slide 72 fixed adjacent a turning roller 73. Thus, the free dimension of the loop segment 115 may be selected to a wave form longer or equal as the first elastic mode of the film strip and will isolate the film strip from any higher elastic components that may be induced therein in the course of takeup onto a reel 81.

At the input side receives the film strip 11 laid along an input guide block 82 which, once again, aligns at an angle E relative the aperture plane. Guide block 82 includes a polished surface 83 defining its input guide surface, surface 83 being aligned in opposition to the trailing corner of a curved control piece 84. Control piece 84, at the other, leading end extends adjacent the periphery of yet another sprocket wheel assembly 80 which intermittently advances a length of the film strip 11 into a free hanging loop segment 116 from an alignment with respect to the control piece. Thus, prior to the pulling stroke of sprocket assembly 60 a free, looped segment of the film strip is laid onto the surface 83 of guide block 82. Since the film strip segment is laid from a shaped surface onto the surface along the incline E little, if any, higher component elastic motion is induced.

The interval during which the free loop segment 116 is laid onto the surface 83 is the interval during which the film strip 11 is maintained stationary in the aperture assembly 50. Since registration of the image in the aperture is fixed while the shutter 110 is open the development of loop 116 is effectively isolated from the pulling stroke. Moreover, since the frame rate is fixed by the filtering time constant of the human eye (1/20th of a second or faster) all film configurations including film strip 11 are sized to have first elastic modes at a frequency substantially higher than this time constant.

Figure 4:
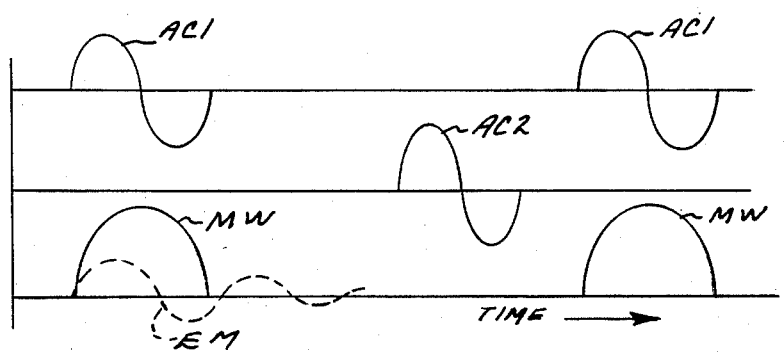
FIG. 4 is a graph of the various accelerations entailed in the present invention.

Thus, by reference to FIG. 4 the acceleration component of wheel assembly 60, shown as a curve AC1, is selected to a motion waveform MW which is lower in frequency than the film elastic mode EM. The acceleration component AC2 for laying out the free loop 116 is equal or lower in frequency relative the first elastic mode EM. Thus, full isolation is achieved of all higher mode components in the film strip and should any such be induced felt strips 153 on the opposed surfaces of guide 51 and shoe 55 will take those out through friction.

Of course, the process described above requires two coherently sequenced drives shown as torquers 281 and 282 which engage toothed belts 283 and 284 respectively driving wheel assemblies 60 and 80. The torquers, in turn, respond through optical devices 93 and 94 to optical signal tracks 91 and 92 geared with shutter 110. This provides the necessary coordination of the acceleration wave forms AC1 and AC2 which by selection of time constants in the drive and the belts is limited, again, to the first mode in the film strip 11.

Accordingly, the force input to the film strip is fixed to excite the first elastic mode and the path shape of the film is limited to that mode only. All other, higher modes are thus either eliminated or quickly damped by the felt strips thereby limiting image jitter. Consequently, well shaped acceleration modes may be selected by selection of the time constants of torquers 281 and 282 to advance the film strip in advancement increments entailing the first mode only. Moreover, the mass and pitch inertia of shoe 51 may be matched with the spring constants and spacing of springs 52 to respond only to the first film mode. Simply, in the simplest form the motion of shoe 51 can be described as follows:

$$M \frac{d^2x}{dt^2} + 2kx = F1$$

$$I \frac{d^2\theta}{dt^2} + 2rk\theta = F2$$

where m is the mass of the shoe, I is its polar moment of inertial, r is the distance to the springs 52 from the polar center and k is their spring constant. Thus, F1 approximates as:

$$F1 = \sqrt{\frac{m}{2k}}$$

and F2 approximates as:

$$F2 = \sqrt{\frac{I}{2rk}}$$

The modes of elastic deflection of a film strip, in turn, can be approximated as a uniform beam relationship:

$$Ei \frac{d^4y}{dx^4} + M \frac{d^2y}{dt^2} = F3$$

where E is its sectional elastic modulus, i is its unit inertia, M is the unit mass density and x and y are the coordinates. This reduces itself to a first mode free-free beam approximation:

$$F3 \approx \sqrt{X}$$

where X is the first mode of free elastic of strip 11 motion. Thus, by selecting F1 and F2 to be less than F3 all higher order terms disappear and the sprocket accelerations resolves itself into film advancement. The selection of mass m, inertia I, the spacing r and coefficient k of the shoe suspension can thus accommodate various film materials to obtain the result desired, i.e.:

$$F1 \ \& \ F2 \geqq F3$$

Obviously, many modifications and changes may be made to the foregoing description without departing from the spirit of the invention. It is therefore intended that the scope of the invention be determined solely on the claims appended hereto.

What is claimed is:

1. In a film transport characterized by a first and second storage reel across which a film strip is advanced said film strip having a fundamental waveform of longitudinal elastic deflection, the improvement comprising:
    an aperture assembly including a fixed base member having a sliding surface for supporting said film strip said sliding surface being convolved to a wave shape equal or longer than said fundamental wave form; and
    a conforming shoe aligned over said sliding surface and urged thereagainst by spring means, the mass and rotary inertia of said shoe and said spring means being selected to combine in first resonances which are less or equal to the frequency of said wave form.

2. Apparatus according to claim 1 further including:
    felt strips attached to said shoe in alignment towards said sliding surface.

3. Apparatus according to claim 2 further including:
    intermittent advance means connected to said film transport for intermittently advancing said strip over said sliding surface.

4. Apparatus according to claim 3 wherein:
    said intermittent advance means includes a first advancing mechanism at the input end of said sliding surface for intermittently deploying a first free loop of said strip and a second advancing mechanism at the output side of said sliding surface for intermittently drawing said first free loop of said strip.

5. Apparatus according to claim 4 wherein:
    said first and second advancing mechanism operate intermittently relative each other.

6. Apparatus according to claim 5 further including:
    shutter means attached to said film transport and operatively connected to enable said first and second advancing mechanism.

* * * * *